United States Patent
Peng et al.

(10) Patent No.: US 9,939,608 B2
(45) Date of Patent: Apr. 10, 2018

(54) VOICE COIL MOTOR

(71) Applicant: INDUSTRIAL TECHNOLOGY RESEARCH INSTITUTE, Hsinchu Hsien (TW)

(72) Inventors: Wen-Yang Peng, Hsinchu (TW); Cheng-Hsuan Lin, Hsinchu (TW); Chien-Sheng Liu, Hsinchu (TW); Yu-Hau Chang, Hsinchu (TW)

(73) Assignee: INDUSTRIAL TECHNOLOGY RESEARCH INSTITUTE, Hsinchu Hsien (TW)

( * ) Notice: Subject to any disclaimer, the term of this patent is extended or adjusted under 35 U.S.C. 154(b) by 335 days.

(21) Appl. No.: 14/974,070

(22) Filed: Dec. 18, 2015

(65) Prior Publication Data

US 2017/0176710 A1    Jun. 22, 2017

(51) Int. Cl.
*G02B 7/09* (2006.01)
*H02K 41/035* (2006.01)
(Continued)

(52) U.S. Cl.
CPC .............. *G02B 7/09* (2013.01); *G02B 27/646* (2013.01); *G03B 5/04* (2013.01); *G03B 13/36* (2013.01);
(Continued)

(58) Field of Classification Search
CPC ........ G02B 27/646; G02B 7/09; G03B 13/36; G03B 2205/0015; G03B 2205/0023; G03B 2205/0069; G03B 5/04; H02K 41/0356
(Continued)

(56) References Cited

U.S. PATENT DOCUMENTS

2013/0016428 A1    1/2013 Sugawara et al.
2013/0242181 A1    9/2013 Phoon et al.
(Continued)

FOREIGN PATENT DOCUMENTS

CN    102798959    11/2012
CN    102890326    1/2013
(Continued)

OTHER PUBLICATIONS

LI. "Design of Miniaturized Auto-Focusing VCM Actuators with Using Pre-Compression Magnet Force", Master's Thesis of Department of Mechanical Engineering National Chung Cheng University, Jan. 1, 2014.
(Continued)

*Primary Examiner* — Alex W Mok
(74) *Attorney, Agent, or Firm* — Amin, Turocy & Watson LLP

(57) ABSTRACT

This disclosure provides a voice coil motor, including a magnet holder, a magnet set, a lens holder, a lens set, an upper and lower elastic piece and a circuit board. The magnet set has four magnets mounted on four sides of the magnet holder, each of the magnets having opposing N/S and S/N magnetic poles. The lens set is disposed in the lens holder. The upper and lower elastic pieces are mounted above and below the lens holder, respectively. Four focusing coil loops are disposed between the lens holder and magnet set, and correspond to the four magnets of the magnet set. Four optical image stabilization coil loops are disposed on the circuit board and correspond to the four magnets of the magnet set, respectively. The focusing coil loops and optical image stabilization coil loops share the magnet set. Therefore, the voice coil motor has a size reduced.

15 Claims, 9 Drawing Sheets

(51) Int. Cl.
  *G03B 5/04* (2006.01)
  *G02B 27/64* (2006.01)
  *G03B 13/36* (2006.01)

(52) U.S. Cl.
  CPC . *H02K 41/0356* (2013.01); *G03B 2205/0015* (2013.01); *G03B 2205/0023* (2013.01); *G03B 2205/0069* (2013.01)

(58) Field of Classification Search
  USPC ...................................................... 310/12.16
  See application file for complete search history.

(56) References Cited

U.S. PATENT DOCUMENTS

| | | | |
|---|---|---|---|
| 2014/0009631 A1 | 1/2014 | Topliss | |
| 2014/0333784 A1* | 11/2014 | Hu | G02B 27/646 348/208.2 |
| 2014/0355118 A1* | 12/2014 | Park | G02B 27/646 359/557 |
| 2014/0368914 A1* | 12/2014 | Hu | G02B 27/646 359/557 |
| 2014/0368915 A1* | 12/2014 | Hu | G02B 27/646 359/557 |
| 2014/0368936 A1* | 12/2014 | Hu | G02B 27/646 359/824 |
| 2014/0376090 A1* | 12/2014 | Terajima | G02B 27/646 359/557 |
| 2015/0168668 A1 | 6/2015 | Wu et al. | |

FOREIGN PATENT DOCUMENTS

| | | |
|---|---|---|
| CN | 204131360 | 1/2015 |
| CN | 204360063 | 5/2015 |
| CN | 104808416 | 7/2015 |
| TW | 201118415 | 6/2011 |
| TW | 201215911 | 4/2012 |
| TW | I412215 | 10/2013 |
| TW | I443443 | 7/2014 |
| TW | 201443540 | 11/2014 |
| TW | 201508372 | 3/2015 |
| WO | 2014/008012 | 1/2014 |

OTHER PUBLICATIONS

Murphy, et al. "Lens Drivers Focus on Performance in High-Resolution Camera Modules", Analog Devices, Jan. 1, 2006, vol. 40, pp. 1-3.

Liu, et al. "Design and Characterization of Miniature Auto-Focusing Voice Coil Motor Actuator for Cell Phone Camera Applications", IEEE Transactions on Magnetics, Jan. 1, 2009, vol. 45, No. 1, pp. 155-159.

Liu, et al. "A miniaturized low-power VCM actuator for auto-focusing applications", Optics Express, Jan. 1, 2008, vol. 16, pp. 2533-2540.

Liu, et al. "High Positioning Repeatability of Miniature Actuator", Sensors and Materials, Jan. 1, 2008, vol. 20, pp. 319-326.

Liu, et al. "Miniature Auto-Focusing Voice Coil Motor Actuator with Excellent Shock Resistance", Adv. Sci. Lett, Jan. 1, 2012, vol. 1. 8, pp. 83-88.

Chiu, et al. "Optimal design and experimental verification of a magnetically actuated optical image stabilization system for cameras in mobile phones", Journal of Applied Physics, vol. 103, pp. 07F136-1-07F136-3, 2008.

Chung. "Development of compact auto focus actuator for camera phone by applying new electromagnetic configuration", Proc. of SPIE, vol. 3048, pp. 60480J-1-60480J-9, 2005.

Chiu, et al. "Optimal Design of Magnetically Actuated Optical Image Stabilizer Mechanism for Cameras in Mobile Phones via Genetic Algorithm", IEEE Transactions on Magnetics, vol. 43, pp. 2582-2584, 2007.

Taiwanese Office Action for Taiwanese Patent Application No. 104142687 dated Jul. 7, 2016.

* cited by examiner

VOICE COIL MOTOR

BACKGROUND

1. Technical Field

The present disclosure relates to voice coil motors, and, more specifically, to a multi-axis voice coil motor with reduced thickness or volume.

2. Description of Related Art

With a continuous demand for less weight and less thickness of the lens set in cameras or wearable cameras, there are increasing needs for thin lens module which has a thickness less than 3.5 mm. On the other hand, with the improvement of the optical image stabilization technology, the number and size of optical actuator increase. Therefore, there are multiple technical bottle necks for designing a multi-axis actuator today.

The foregoing challenges include the difficulty in the design of multi-axis actuator itself and the production quality. The problems of designing multi-axis actuator include how to simultaneously provide auto focus (AF), the 3-5 axis directions required for OIS, as well as to keep the thickness under 4 mm. The challenges in production on the other hand include how to design a simple process to achieve an automatic manufacturing with high precision, speed and able to satisfy the yield requirement. Moreover, the thickness of the cell-phone camera module (CCM) has always been a focus for development which has gone from a few dozen mm to 7-8 mm now. The AF actuator moves in one parallel direction along the optical axis, allowing the lens to move about 0 to 0.5 mm to focus on the object. The OIS actuator moves in a least 2 vertical directions along the optical axis to compensate the displacement motion ($<\pm 0.2$ mm) or rotational movement ($<\pm 0.4°$) caused by camera shakes. Generally, a camera module with OIS function also has AF function, which is achieved by mounting actuator elements below the AF actuator, which moves along 2-4 axis directions, and using the gyroscope to measure the selectively configured two motion displacement/tilting or 2 motion displacement and 2 tilting in more advanced setting to calculate the compensated displacement motion. Since the required number for optical actuators increases to 3-5 optical actuators, the overall thickness of the module also undesirably increases. The miniaturized elements and increasing number of actuators dramatically increase the difficulty in manufacturing and set a series of technical challenges in the field.

In order to satisfy 5 axis micro-optical actuator (MOA) required for AF and OIS, the commonly used voice coil motor (VCM), though having the advantages of high yield, low cost, simplicity in structure and high reliability, would cause the overall thickness to increase 2 mm when axis number increased from 3 to 5. Therefore, it would be difficult to be accommodated in the product without protruding from the product surface. In manufacturing, CCM mainly consists of lenses, IC circuit and VCM. Since the module is reduced in size, the volume of the lenses and VCM is also reduced, which results in problems such as malfunctions in lenses and low assembly yield.

Accordingly, there is an urgent need in the CCM field to develop an image module which is thin and capable of producing high quality image with increasing axis directions without increasing the thickness.

SUMMARY

The present disclosure provides a voice coil motor, comprising: a magnet holder having a hollow part; a magnet set configured to have four magnets disposed at four sides of the magnet holder, respectively, each of the magnets having opposing N/S and S/N magnetic poles; a lens holder disposed in the hollow part of the magnet holder and having a through part; four single focusing coil loops disposed between the magnet set and the lens holder; a lens set disposed in the through part of the lens holder; an upper elastic piece and a lower elastic piece located above and below the lens holder, respectively, for providing the lens set with restricting and returning forces; and four independent optical image stabilization coil loops disposed on a circuit board and corresponding to the four magnets of the magnet set, respectively.

The present disclosure further provides a voice coil motor, comprising: a magnet holder having a hollow part; a magnet set configured to have four magnets disposed at four sides of the magnet holder, respectively, each of the magnets having opposing N/S and S/N magnetic poles; a lens holder disposed in the hollow part of the magnet holder and having a through part; four independent focusing coil loops disposed between the magnet set and the lens holder; a lens set disposed in the through part of the lens holder; an upper elastic piece and a lower elastic piece located above and below the lens holder, respectively, for providing the lens set with restricting and returning forces; and four independent optical image stabilization coil loops disposed on the circuit board and corresponding to the four magnets of the magnet set, respectively.

In one embodiment, two of the four independent loops provide opposite currents to corresponding two of the focusing coil loops for producing a counter force, allowing the lens holder to rotate.

As compared with existing prior art, the voice coil motor according to an embodiment of the present disclosure has four focusing coil loops, one magnet set and four optical image stabilization coil loops, and the focusing coil loops and the optical image stabilization coil loops share the same magnet set. Therefore, the voice coil motor has a simplified structure and reduced material and assembly cost, and meets the miniaturization requirement. Further, by providing opposing currents to opposing two of the focusing coil loops, the lens holder is able to rotate, and the lens set has a freedom of five axis directions. Therefore, the camera shakes are compensated, and the efficiency for preventing camera shakes is improved effectively.

DETAILED DESCRIPTION

Figure 1:
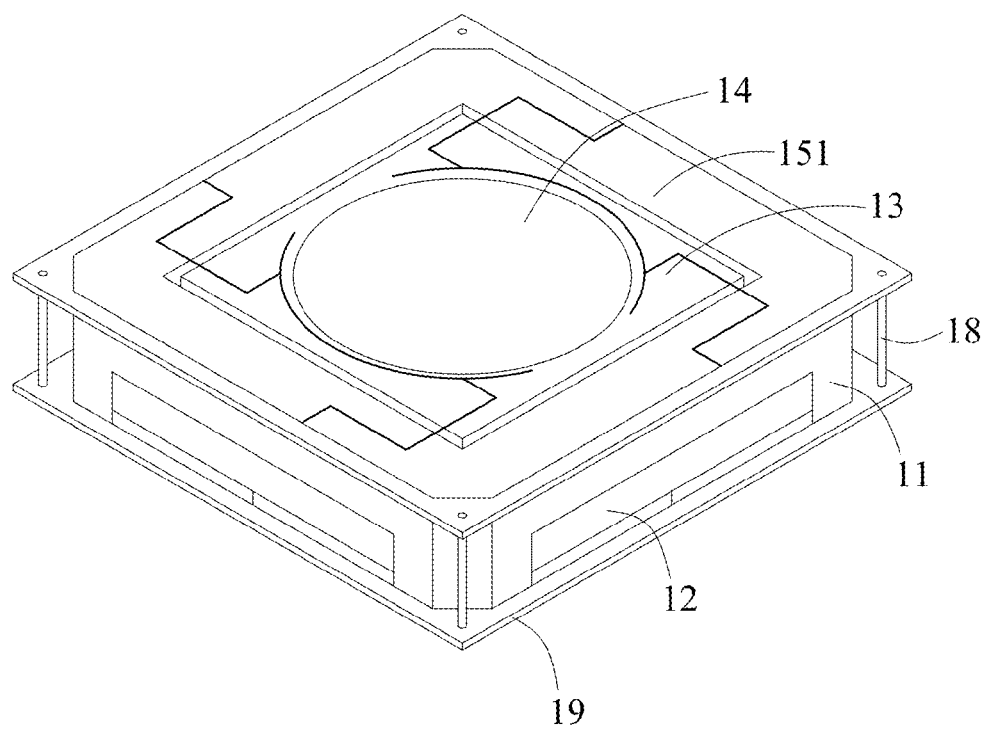
FIG. 1 is a schematic diagram of a voice coil motor according to the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
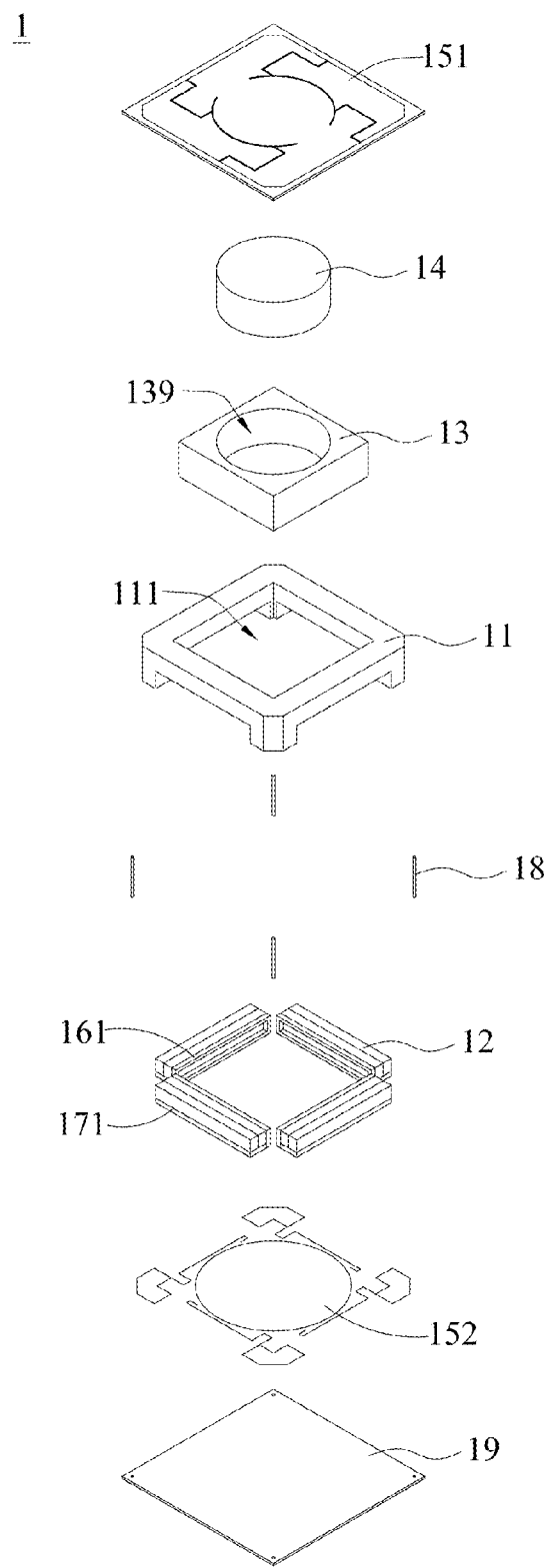
FIG. 2 is an exploded view of a voice coil motor according to the present disclosure.

FIG. 1 is a schematic diagram showing a voice coil motor 1 according to the present disclosure. FIG. 2 is an exploded view of the voice coil motor 1 according to the present disclosure. Please refer to both FIGS. 1 and 2 as the components shown in FIG. 2 are assembled to form the voice coil motor 1 shown in FIG. 1. The voice coil motor 1 can be applied in a camera module for controlling the lateral and vertical movements of the lens set. The voice coil motor 1 comprises a magnet holder 11, a magnet set 12, a lens holder 13, a lens set 14, an upper elastic piece 151, a lower elastic piece 152, focusing coil loops 161, optical image stabilization coil loops 171, and a circuit board 19.

The magnet holder 11 has a hollow part 111. As shown in FIGS. 1 and 2, the magnet holder 11 can be a frame, having the hollow part 111 in the middle.

The magnet set 12 has four magnets at the four sides of the magnet holder 11, each of the magnets having opposing N/S and S/N magnetic poles. In an embodiment, the magnets are magnetized such that each of the magnets have N/S or S/N magnetic poles on four side thereof, or consists of two magnetic bars having N/S magnetic poles and inversely disposed. The magnet set 12 is disposed around the four frames of the magnet holder 11.

The lens holder 13 is disposed in the hollow part 111 of the magnet holder 11. The lens holder 13 has a through part 139. Four focusing coil loops 161 are disposed between the magnet set 12 and the lens holder 13.

In an embodiment, the focusing coil loops 161 comprise four coil loops that are supplied with power independently. In another embodiment, the focusing coil loops 161 comprise four single loops or two pairs of single loops. Therefore, a single loop supplies a current to four focusing coil loops, four loops supply four current to four independent coil loops, respectively, or two loops supply two currents to two pairs of independent coil loops, respectively.

Figure 8A:
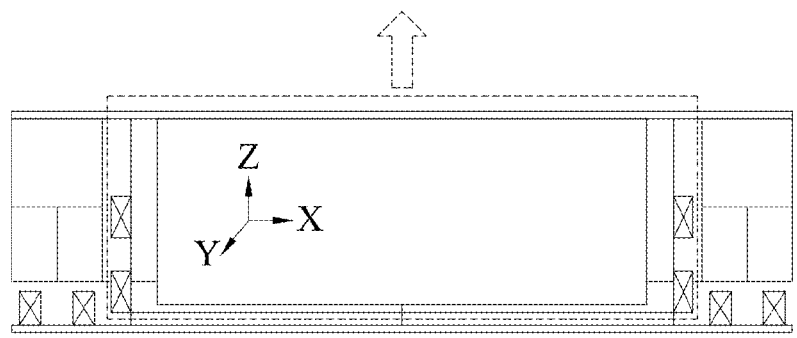
FIGS. 8A, 8B and 8C are schematic views showing the displacement of the lens holder with different currents in the voice coil motor according to the present disclosure.
Figure 8B:
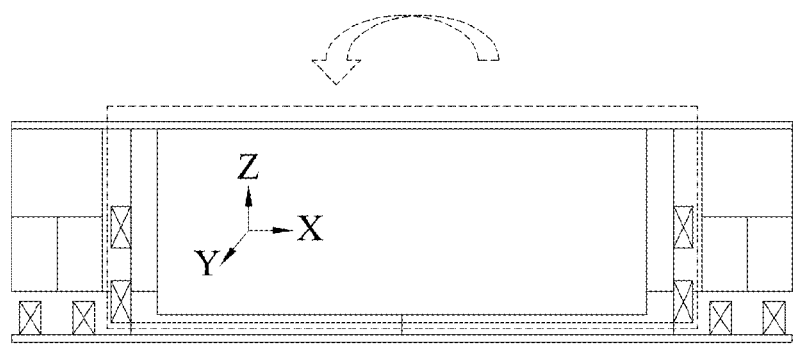

Through supplying the focusing coil loops with different current modes, the lens holder can slide or rotate, which is determined by the configuration of loop number and coils. If a single loop supplies a current, which means that four independent coil loops are supplied with the same current, or four serially connected coil loops are supplied with the same current, the lens set would move horizontally along the Z axis, for instance, as shown in FIG. 8A. Conversely, if the four coil loops are independently configured, the lens set will rotate along the X axis or Y axis, as shown in FIG. 8B.

The lens set 14 is disposed in the through part 139 of the lens holder 13. In an embodiment, the lens holder 13 is disposed in the hollow part 111 of the magnet holder 11, and then the lens set 14 is disposed in the through part 139 of the lens holder 13.

The upper elastic piece 151 is located above the lens holder 13. The lower elastic piece 152 is located below the lens holder 13. As shown in FIGS. 1 and 2, the upper elastic piece 151 can have circular elastic metal wires corresponding to the lens set 14, and the lower elastic piece 152 can have circular elastic metal wires corresponding to the lens set 14. The upper elastic piece 151 and the lower elastic piece 152 can provide restricting effect to restrict the movement of the lens set 14 or the lens holder 13 after the lens set 14 or the lens holder 13 move. Furthermore, the upper elastic piece 151 and the lower elastic piece 152 can also provide a returning force for the lens set 14 or the lens holder 13 to return to the original position.

The circuit board 19 is coupled to the upper elastic piece 151 via four spring wires 18. Four optical image stabilisation coil loops 171 are disposed on the circuit board 19 and correspond to the four magnets of the magnet set 12, respectively. In an embodiment, the optical image stabilization coil loops 171 are located between the circuit board 19 and the magnet set 12. As a current is supplied to the opposing two of the four optical image stabilization coil loops 171 simultaneously, the lens holder 13 or the lens set 14 can translate laterally.

Figure 3:
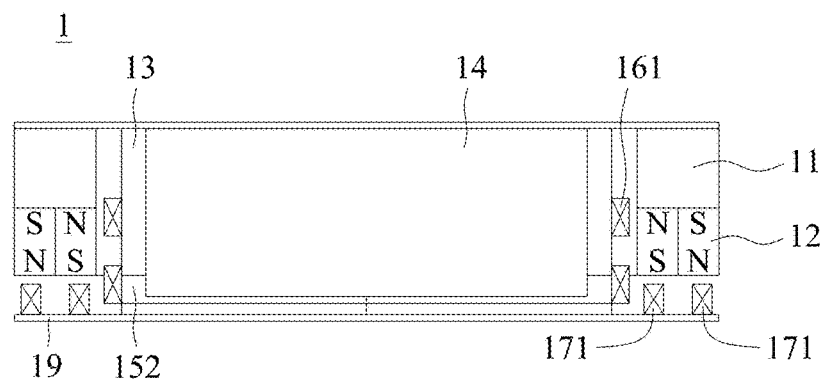
FIG. 3 is a cross-sectional view of a voice coil motor according to the present disclosure.

FIG. 3 is a cross-sectional view of the voice coil motor 1 according to the present disclosure.

The magnet set 12 of the voice coil motor 1 has magnets on left and right sides thereof. In an embodiment, each of the magnets, after magnetized or combined, has opposing N/S and S/N magnetic poles. In another embodiment, each of the magnets has a pair of N/S magnetic pole and S/N magnetic pole at the corresponding side of the focusing coil loops 161 and the optical image stabilization coil loops 171. The four magnets at the four sides of the magnet holder 11 constitute the magnet set 12. In addition, the front and the back of the voice coil motor 1 can have magnets as described above.

The lens set 14 is located at the center of the voice coil motor 1, and is supported by the lower elastic piece 152. The focusing coil loops 161 surround the lens holder 13, and are between the lens holder 13 and the magnet set 12. The optical image stabilization coil loops 171 are disposed on the circuit board 19, and between the circuit board 19 and magnet set 12. In an embodiment, the focusing coil loops 161 and optical image stabilization coil loops 171 are disposed on the two sides of the magnet set 12, respectively. Therefore, the focusing coil loops 161 and the optical image stabilization coil loops 171 share a single magnet set, i.e., the magnet set 12. Compared with the prior art, in which the focusing coil loops and the image stabilization coil loops require different magnet sets, the focusing coil loops 161 and the optical image stabilization coil loops 171 of the voice coil motor 1 according to the present disclosure share the same magnet set 12. Therefore, the voice coil motor 1 has reduced thickness and size. In an embodiment, the voice coil motor 1 can have a size less than 3.5 mm.

Figure 4A:
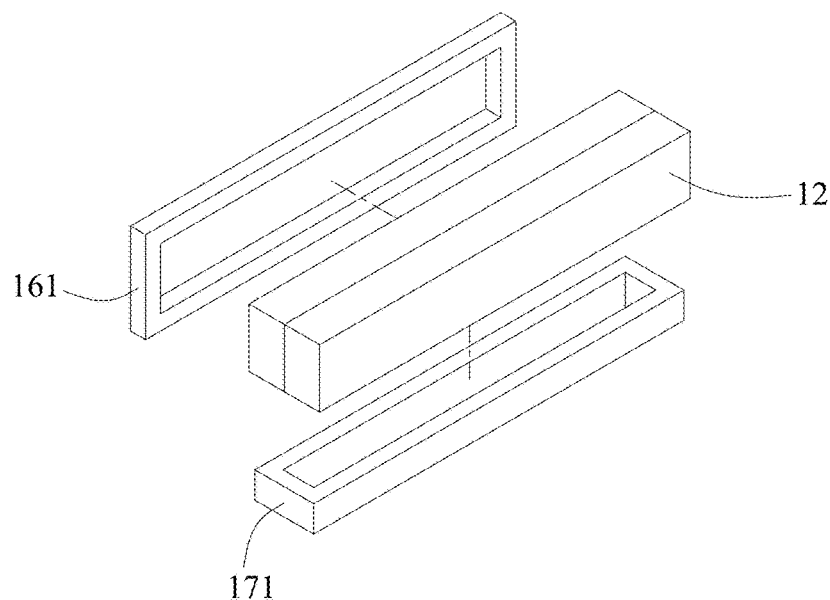
FIGS. 4A and 4B are schematic views showing the relation between a magnet set of the voice coil motor and coil loops according to the present disclosure.
Figure 4B:
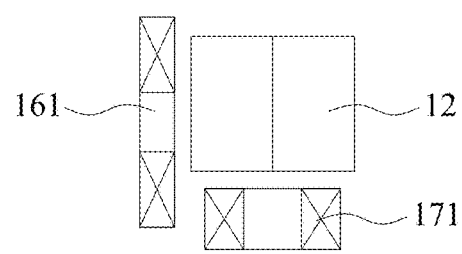

FIGS. 4A and 4B are schematic views showing the relation between the magnet set and the coil loops of the voice coil motor according to the present disclosure;

FIG. 4A is a 3D illustration showing the relations of the focusing coil loops 161, the optical image stabilization coil loops 171 and the magnet set 12. In an embodiment, the focusing coil loops 161 are disposed on the sides of the magnet set 12, while the optical image stabilization coil loops 171 are disposed under the magnet set 12, such that they all share the same magnet set 12.

FIG. 4B shows the relative size between the focusing coil loops 161, the optical image stabilization coil loops 171 and the magnet set 12. In an embodiment, each of the focusing coil loops 161 has a width greater than a height of the magnet set 12. In another embodiment, each of the optical image stabilization coil loops 171 has a width less than a width of the magnet set 12. The present disclosure however is not limited to the above size limitations.

The foregoing example of size relation of the focusing coil loops 161, the optical image stabilization coil loops 171 and the magnet set 12 also has the advantage of preventing interferences of two coils, which should be taking care of during the compensation motion.

Figure 4C:
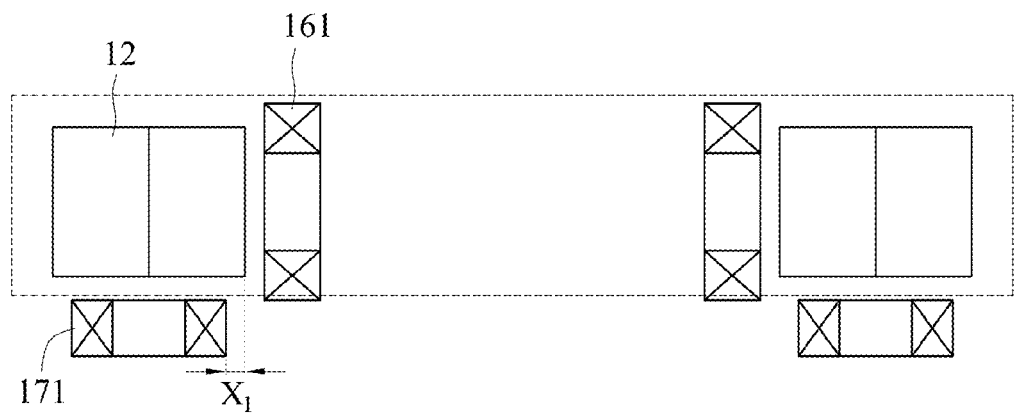
FIGS. 4C and 4D are schematic views showing the relation between the magnet set and the coil loops before and after compensation.

FIG. 4C is a schematic view showing the situation before the optical compensation for camera shakes. As shown, each of the magnets of the magnet set 12 has a focusing coil loop 161 on the right and the left sides, and an optical image stabilization coil loop 171 below the magnets of the magnet set 12. In an embodiment, each of the optical image stabilization coil loops 171 has a width less than a width of the magnet set 12, so as to define a distance $X_1$ between the optical image stabilization coil loop 171 and the side of the magnet set 12.

Figure 4D:
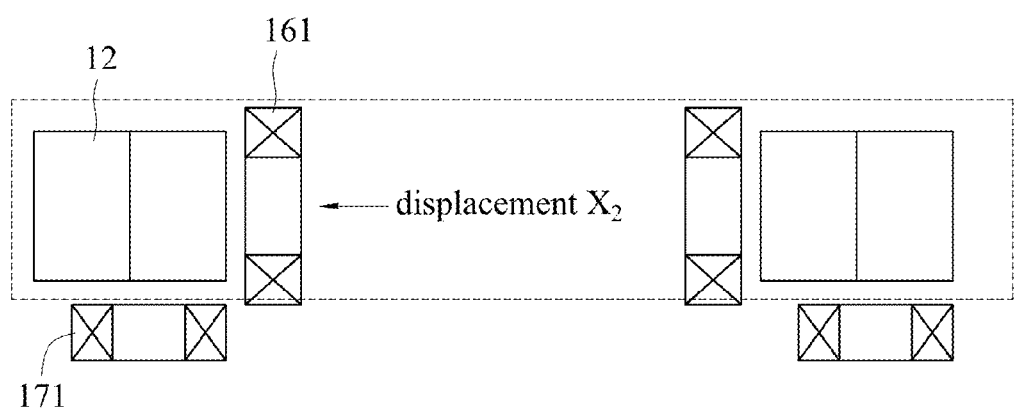

FIG. 4D is a schematic view showing the situation after the optical compensation for camera shakes. During the optical compensation, the optical image stabilization coil loops 171 remain stationary, while the magnet set 12 and the focusing coil loops 161 move. The moving parts move along the direction of X or Y axis. As shown, the displacement $X_2$, which is set to be the maximum displacement required for optical compensation to prevent camera from shaking. During the compensation motion, $X_1$ is greater than $X_2$, and the focusing coil loops 161 will not interfere with the optical image stabilization coil loops 171. As such, with an appropriate relation in location and size between the two coil loops and the magnet set 12, the interference can be prevented from occurrence.

The size relation between the focusing coil loops 161, the optical image stabilization coil loops 171 and the magnet set 12 configured as described above allows the magnetic lines of the magnet set 12 to appropriately pass through the focusing coil loops 161 and the optical image stabilization coil loops 171, to provide an appropriate excitation current to the coils to cause the lens set to move or rotate in the different directions.

Accordingly, in the present disclosure, by arranging the magnets having different magnetic poles to be close to each other and a specific configuration of the magnets and the coils, the number of the magnets is reduced and the requirement of the conventional magnet bars (as required in the conventional voice coil motor), so as to reduce the thickness and size of the multi-axis voice coil motor.

Figure 5:
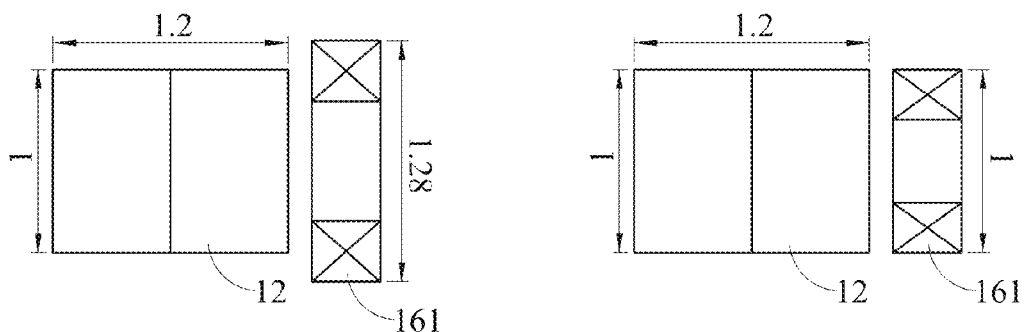
FIG. 5 is a comparative diagram collection showing the exerted force of the focusing coil loops in different heights in the voice coil motor according to the present disclosure.
Figure 5:
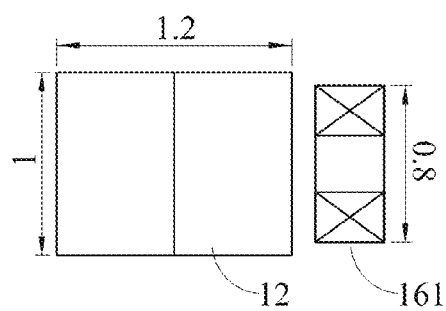
Figure 5:
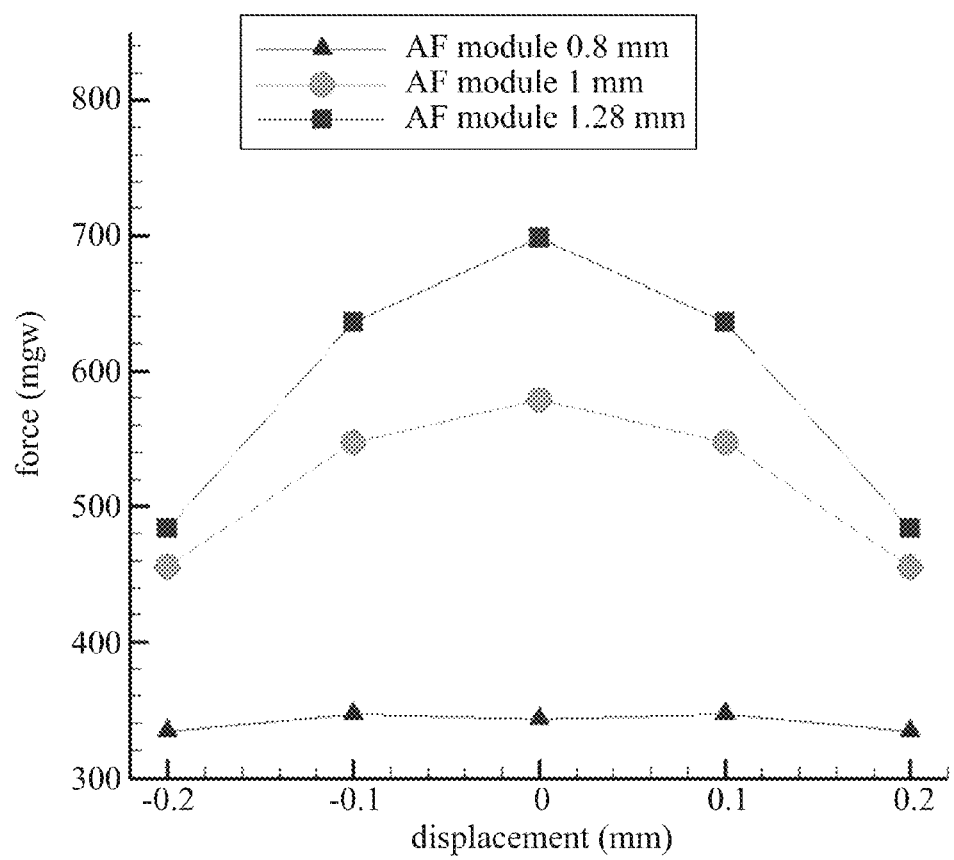

FIG. 5 is a comparative diagram collection showing the exerted force of the focusing coil loops of different widths in the voice coil motor according to the present disclosure. As shown in FIG. 5, the focusing coil loops 161 of three different widths are tested. The relations of the exerted force between the focusing coil loops 161 and the magnets can be obtained by setting the width and the height of the magnets of the magnet set 12 to be 1.2 mm and 1 mm, respectively, while adjusting the width of the focusing coil loops 161 as 0.8 mm, 1 mm and 1.28 mm, sequentially. According to FIG. 5, as the width of the focusing coil loops 161 increases, the exerted force provided by the coil loops also increases. As such, the total width of the focusing coil loops 161 is greater than the height of the magnet set 12 and the ratio thereof is about 1 to 1.28.

Figure 6:
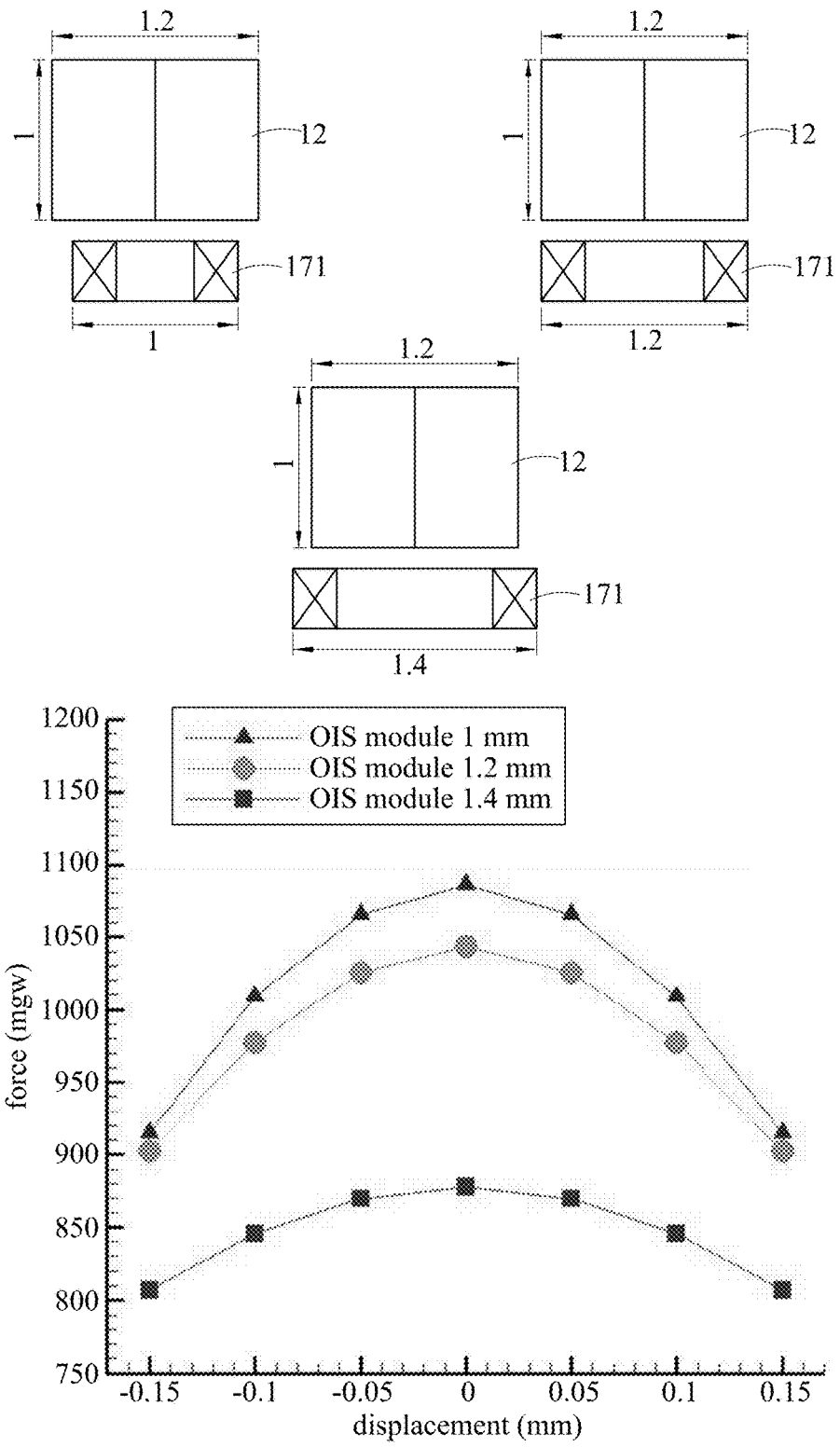
FIG. 6 is a comparative diagram collection showing the exerted force of the optical image stabilization coil loops in different widths in the voice coil motor according to the present disclosure.

FIG. 6 is a comparative diagram collection showing the exerted force of the optical image stabilization coil loops of different widths in the voice coil motor according to the present disclosure. As shown in FIG. 6, the optical image stabilization coil loops 171 of three different widths are tested. The relations of the exerted force between the optical image stabilization coil loops 171 and the magnets can be obtained by setting the width and the height of the magnets of the magnet set 12 to be 1.2 mm and 1 mm, respectively, while adjusting the width of the optical image stabilization coil loop 171 as 1 mm, 1.2 mm and 1.4 mm, sequentially. According to FIG. 6, as the width of the optical image stabilization coil loop 171 decreases, the exerted force provided by the coil loops also increases. As such, the total width of the optical image stabilization coil loops 171 is greater than the width of the magnet sets 12, and the ratio thereof is about 0.8 to 1.

Figure 7A:
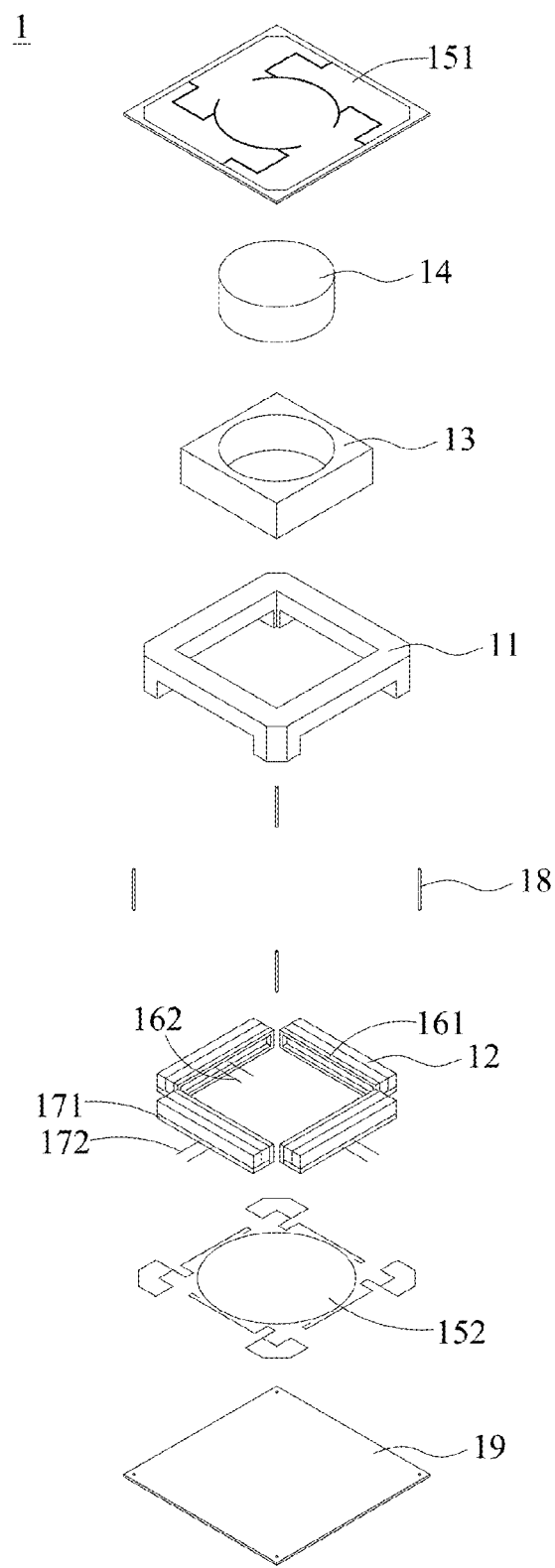
FIGS. 7A and 7B are schematic views of voice coil motors of different embodiments according to the present disclosure.
Figure 7B:
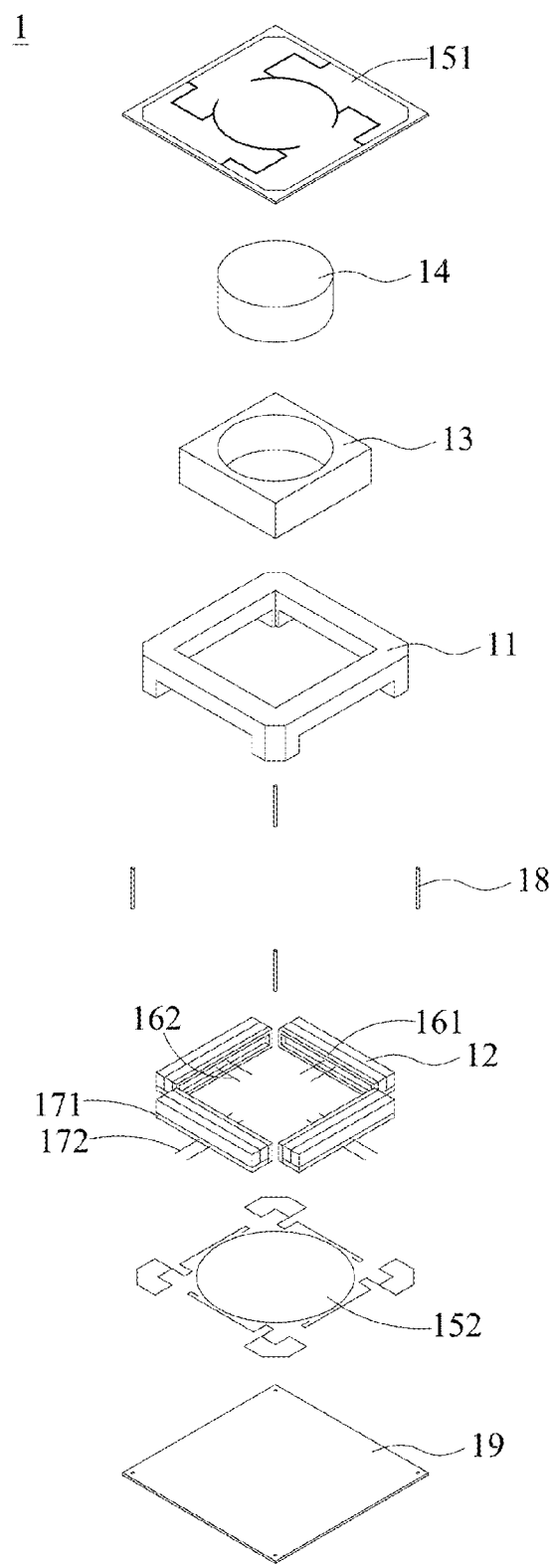

FIGS. 7A and 7B are schematic views of voice coil motors of different embodiments. As shown in the drawings, the voice coil motor 1 comprises a magnet holder 11, a magnet set 12, a lens holder 13, a lens set 14, an upper elastic piece 151 and a lower elastic piece 152, focusing coil loops 161, optical image stabilization coil loops 171 and a circuit board 19. The configuration described in FIGS. 7A and 7B are similar to FIGS. 1 and 2, therefore will not be described in details. This embodiment further discloses the horizontal, vertical or rotational movement under different types of current, In an embodiment, the lens holder 13 moves horizontally as a current is supplied to the two opposing coils of the four optical image stabilization coil loops 171 simultaneously, and a Lorentz force is generated when the current is supplied, allowing the lens set 14 or the lens holder 13 to move along the X or Y axis. As shown in FIGS. 7A and 7B, it is also applicable to provide four independent power supply loops 172 for the four optical image stabilization coil loops, such that when the opposing two coils are powered, the lens set 14 or the lens holder 13 will move horizontally along the X or Y axis.

In another embodiment, the lens holder 13 moves horizontally or rotates as the focusing coil loops 161 are supplied with different current types. This is determined by the loop number of the power supply and the configuration of the coils.

As shown in FIG. 7A, the four focusing coil loops 161 are powered by a single loop 162. Regardless if the focusing coil loops 161 consist of four independent coil loops or the four coil loops are connected in series, the single loop 162 provides a single current to the four coils of the focusing coil loops 161, to cause the lens set 14 or the lens holder 13 to move horizontally along the Z axis, for example.

FIG. 7B shows that the focusing coil loops 161 have four independent loops 162, and as the focusing coil loops 161 consist of four independent coil loops, each of the coil loops corresponds to a loop 162 which supplies the current to the coil loops. As such, if the four loops 162 simultaneously supply a single current to the four independent coils of the focusing coil loops 161, the lens set 14 also moves horizontally along the Z axis, for example.

In an embodiment, if two of the four loops 162 supply opposing currents to the opposing two of the focusing coil loops 161, the two coil loops will generate a counter force, causing the lens set 14 or the lens holder 13 to rotate about the X axis or Y axis, for example. Further, the two opposing coil loops can be in a pair which are powered simultaneously, causing a simultaneous rotation about the X axis and Y axis, to provide the compensation for focusing.

Figure 8C:
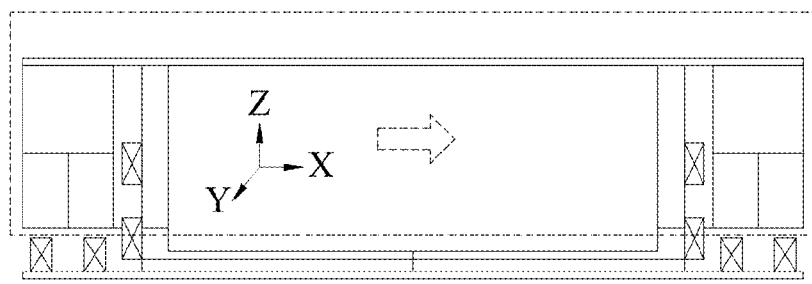

FIGS. 8A, 8B and 8C are schematic views showing the displacement of the lens holder with different currents in the voice coil motor according to the present disclosure.

FIG. 8A shows when the four focusing coil loops 161 are simultaneously powered to produce a Lorentz force and moves along the Z axis. That is, the magnet set 12, the magnet holder 11, and the optical image stabilization coil loops 171 of FIG. 3 are stationary, while the focusing coil loops 161 and the lens set 14 or the lens holder 13 moves, as shown in the dashed line of FIG. 8A.

FIG. 8B shows that powering two of the focusing coil loops 161 with two opposing currents would cause rotation about the X or Y axis. That is, the magnet set 12, the magnet holder 11, and the optical image stabilization coil loops 171 of FIG. 3 are stationary, while the focusing coil loops 161 and the lens set 14 or the lens holder 13 moves.

FIG. 8C shows that simultaneously powering two of the optical image stabilization coil loops 171 would cause displacement along the X or Y axis and the optical image stabilization coil loops 171 remain stationary while the magnet set 12, the magnet holder 11, the focusing coil loops 161 and lens set 14 or the lens holder 13 of FIG. 3 move.

Accordingly, the present disclosure not only provides the technical feature of arranging the magnets having different magnetic poles to be close to each other and a specific configuration of the magnets and the coils, so as to reduce the number of the magnets and eliminate the requirement of magnetizing element, but also provides a total of five axis direction of different driving modes, including horizontal, vertical, rotational motions through providing different configuration of the focusing coil loops and different current types.

In addition, although the disclosed improvement of the voice coils motor according to the present disclosure is exemplified as to be used in a camera. The disclosed voice coil motor should not be limited as such. In other words, the voice coil motor according to the present disclosure could also be used in other passive element such as probes or cutting tools to provide the freedom of controlling 5 axis directions.

From the above, by sharing a single magnet set among the four focusing coil loops and four optical image stabilization coil loops, the voice coil motor is structurally simpler, and fewer magnets are required, thereby reducing the materials and cost for assembly. In particular, the reduction in size favors the miniaturization in elements. In addition, the disclosed configuration of the coils and the different currents provision cause the lens holder to move horizontally, vertically or rotate, to achieve the freedom of five axis direction, in order to compensate the camera shakes.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A voice coil motor, comprising:
   a magnet holder having a hollow part;
   a magnet set configured to have four magnets disposed at four sides of the magnet holder, respectively, each of the magnets having opposing N/S and S/N magnetic poles;
   a lens holder disposed in the hollow part of the magnet holder and having a through part;
   four single focusing coil loops disposed between the magnet set and the lens holder;
   a lens set disposed in the through part of the lens holder;
   an upper elastic piece and a lower elastic piece located above and below the lens holder, respectively, and configured for providing the lens set with restricting and returning forces; and
   four independent optical image stabilization coil loops disposed on a circuit board and corresponding to the four magnets of the magnet set, respectively.

2. The voice coil motor of claim 1, wherein each of the single focusing coil loops has a height greater than a height of the magnet set.

3. The voice coil motor of claim 1, wherein each of the independent optical image stabilization coil loops has a width less than a width of the magnet set.

4. The voice coil motor of claim 1, wherein the lens holder is configured to move horizontally when a current is supplied to opposing two of the independent optical image stabilization coil loops simultaneously.

5. The voice coil motor of claim 1, wherein the lens holder is configured to move vertically when a current is supplied to the single focusing coil loops simultaneously.

6. The voice coil motor of claim 1, further comprising four elastic wires configured to connect the circuit board to the upper elastic piece.

7. The voice coil motor of claim 1, wherein at least one of the magnets of the magnet set consists of two magnetic bars having N/S magnetic poles and inversely disposed.

8. A voice coil motor, comprising:
   a magnet holder having a hollow part;
   a magnet set configured to have four magnets disposed at four sides of the magnet holder, respectively, each of the magnets having opposing N/S and S/N magnetic poles;
   a lens holder disposed in the hollow part of the magnet holder and having a through part;
   four independent focusing coil loops disposed between the magnet set and the lens holder;
   a lens set disposed in the through part of the lens holder;
   an upper elastic piece and a lower elastic piece located above and below the lens holder, respectively, and configured for providing the lens set with restricting and returning forces; and
   four independent optical image stabilization coil loops disposed on a circuit board and corresponding to the four magnets of the magnet set, respectively.

9. The voice coil motor of claim 8, wherein each of the independent focusing coil loops has a height greater than a height of the magnet set.

10. The voice coil motor of claim 8, wherein each of the independent optical image stabilization coil loops has a width less than a width of the magnet set.

11. The voice coil motor of claim 8, wherein the lens holder is configured to move vertically when a current is supplied to the independent focusing coil loops simultaneously.

12. The voice coil motor of claim 8, wherein the lens holder is configured to rotate when two opposite currents are supplied to opposing two of the independent focusing coil loops simultaneously.

13. The voice coil motor of claim 8, wherein the lens holder is configured to move horizontally when a current is supplied to opposing two of the independent optical image stabilization coil loops simultaneously.

14. The voice coil motor of claim 8, further comprising four elastic wires configured to connect the circuit board to the upper elastic piece.

15. The voice coil motor of claim 8, wherein at least one of the magnets of the magnet set consists of two magnetic bars having N/S magnetic poles and inversely disposed.

* * * * *